United States Patent [19]

Starcevich

[11] Patent Number: 5,016,360
[45] Date of Patent: May 21, 1991

[54] TAPE MEASURING APPARATUS

[76] Inventor: Lee E. Starcevich, 6436 W. 167th St., Tinley Park, Ill. 60477

[21] Appl. No.: 493,634

[22] Filed: Mar. 15, 1990

[51] Int. Cl.$^5$ .............................................. G01B 3/10
[52] U.S. Cl. ........................................ 33/758; 33/770
[58] Field of Search ................. 33/755, 756, 757, 758, 33/759, 760, 761, 768, 770, 771

[56] References Cited

U.S. PATENT DOCUMENTS

| | | | |
|---|---|---|---|
| 789,352 | 5/1905 | Badger | 33/758 |
| 2,776,448 | 1/1957 | Trammell, Jr. | 33/761 |
| 2,795,050 | 6/1957 | Van Fleet | 33/757 |
| 3,021,599 | 2/1962 | Odom | 33/760 |
| 3,205,584 | 9/1965 | Overaa | 33/760 |
| 3,418,719 | 12/1968 | Davis | 33/770 |
| 3,935,767 | 2/1976 | McClay, Jr. | 33/755 |
| 3,965,579 | 6/1976 | Woods | 33/758 |
| 4,819,337 | 4/1989 | Noyes | 33/756 |

FOREIGN PATENT DOCUMENTS 1134280 4/1957 France .................................. 33/755

Primary Examiner—Thomas B. Will
Attorney, Agent, or Firm—Leon Gilden

[57] ABSTRACT

An apparatus including a housing mounting a retractable spool of a tape line, with the tape line including a tape line hook to mount the forward edge of the tape line onto a work piece to enhance ease of measuring thereof. An extension web is mounted to the tape line forwardly of the tape line hook and includes an extension web hook member adjustable about the extension web's length to permit adjustment of the extension web's hook relative to the tape line hook. Modifications of the invention include an extension web positionable relative to the tape line. Accordingly, the organization permits ease of measurement from a position spaced from an engagement position of the extension web's hook member.

4 Claims, 4 Drawing Sheets

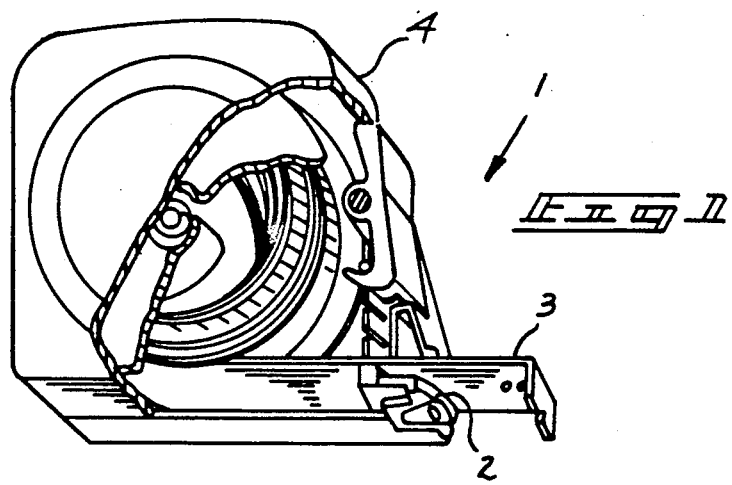
FIG 1
PRIOR ART
FIG 2
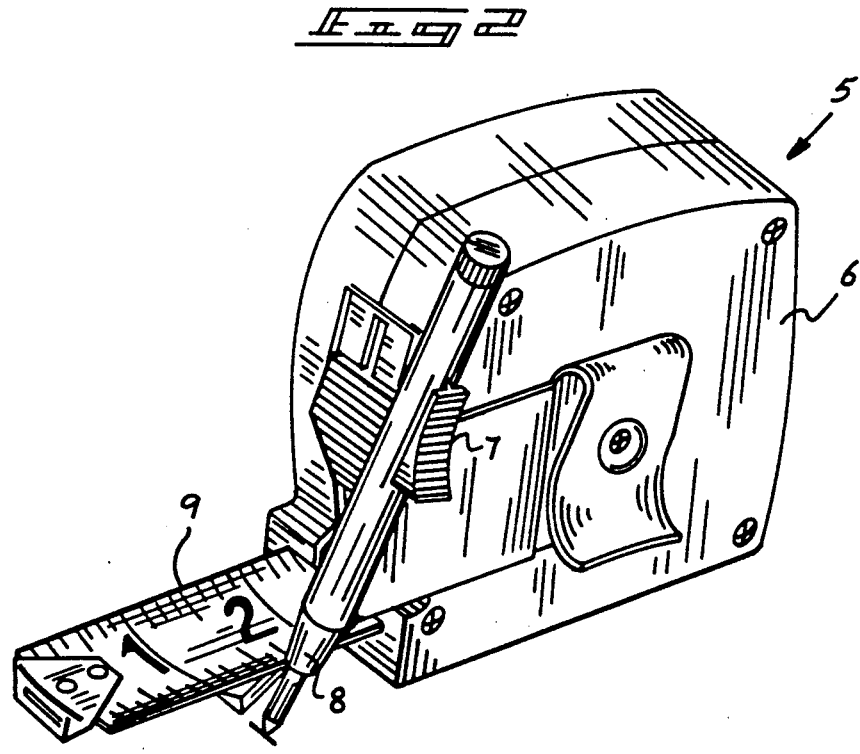
PRIOR ART

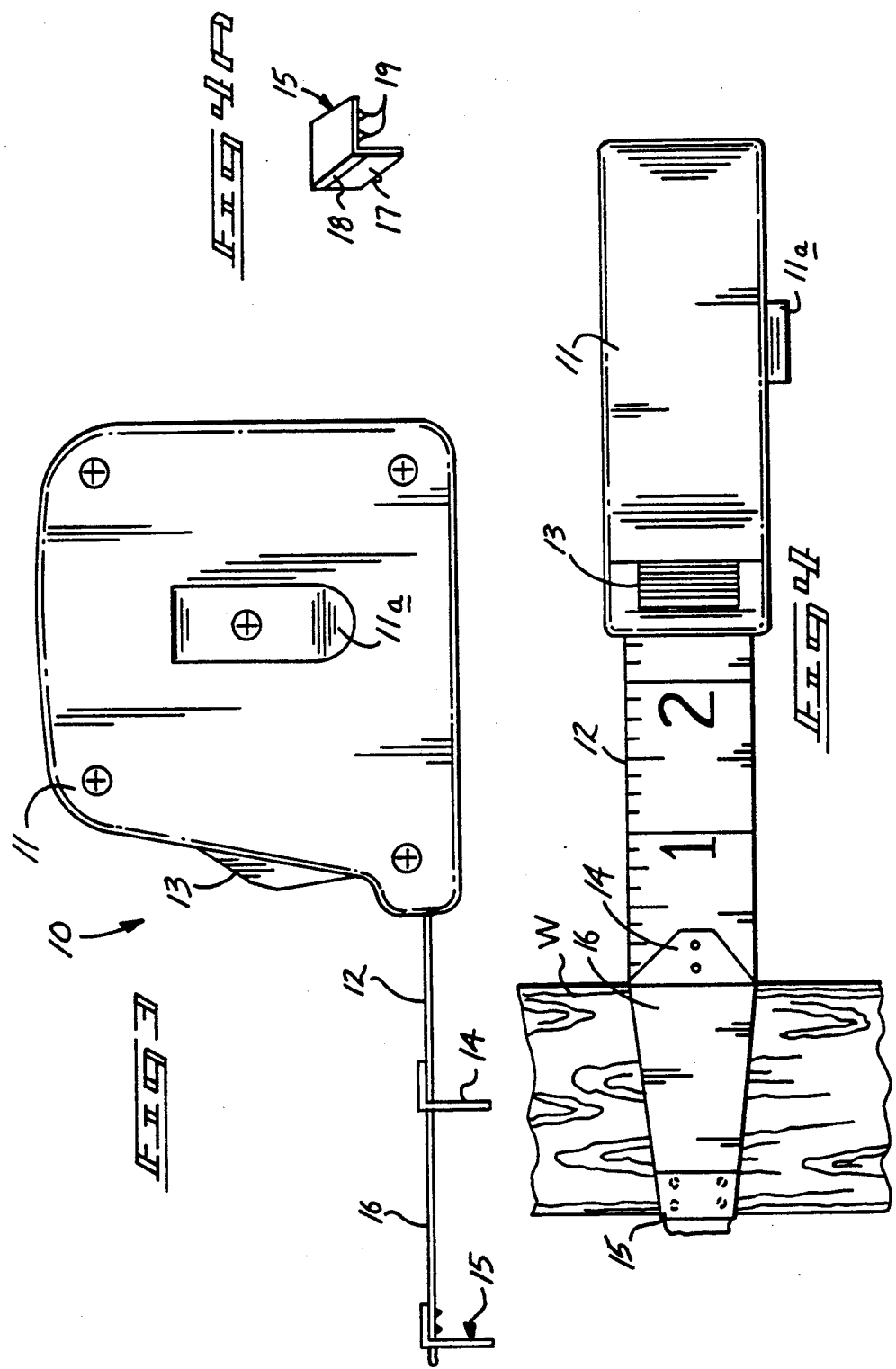

TAPE MEASURING APPARATUS

BACKGROUND OF THE INVENTION

1. Field of the Invention

The field of invention relates to measuring tapes, and more particularly pertains to a new and improved tape measuring apparatus wherein the same permits measuring from a point of origination spaced from a point of engagement relative to a tape line of an extensible tape measuring apparatus.

2. Description of the Prior Art

Measuring tapes of various types have been utilized in the prior art. Frequently, however, an individual wishes to measure from a point spaced from a position that the measuring tape's hook is engaged with. Prior art organizations have heretofore failed to provide such an extension portion and have heretofore not addressed this issue in a satisfactory manner. Examples of the prior art include U.S. Pat. No. 4,479,617 to Edwards wherein a tape measure construction utilizes a retractable tape with a single measuring tape hook including a resilient bumper to cushion shock of the hook in its retraction relative to the housing of the tape organization.

U.S. Pat. No. 4,760,648 to Doak, et al., sets forth the use of a retractable measuring tape organization wherein a marking device includes a support with a writing instrument mounted to the support to permit writing of a measuring point subsequent to a measuring procedure.

U.S. Pat. No. 3,713,603 to Shore sets forth a measuring tape with a wind-up spring utilizing an arresting device to prevent automatic wind-up of the tape.

U.S. Pat. No. 4,649,649 to Fain sets forth a hand-held retractable tape wherein the tape may be uncoiled and extended by holding the tape measure with only one hand, with an internal wheel positionable against a fixed flat surface to arrest the tape in an extended position.

U.S. Pat. No. 4,748,746 to Jacoff sets forth a recoilable tape measuring device wherein the free end of the recoilable tape extends out of the mouth with an extension to permit the tape to be extended from within the cartridge or housing permitting the tape to be recoiled or retracted within the cartridge.

As such, it may be appreciated that there continues to be a need for a new and improved tape measuring apparatus wherein the same permits extension of a variable length extension web mounted to a forward end of a measuring tape line to permit an engagement surface to be grasped by the extension tape and simultaneously permitting measuring from a further surface and in this respect, the present invention substantially fulfills this need.

SUMMARY OF THE INVENTION

In view of the foregoing disadvantages inherent in the known types of measuring tape apparatus now present in the prior art, the present invention provides a tape measuring apparatus wherein the same permits use of an extension web in association with a tape line to permit securement of the tape line at a remote position relative to a point of origination of measuring. As such, the general purpose of the present invention, which will be described subsequently in greater detail, is to provide a new and improved tape measuring apparatus which has all the advantages of the prior art tape measuring devices and none of the disadvantages.

To attain this, the present invention provides an apparatus including a housing mounting a retractable spool of a tape line, with the tape line including a tape line hook to mount the forward edge of the tape line onto a work piece to enhance ease of measuring thereof. An extension web is mounted to the tape line forwardly of the tape line hook and includes an extension web hook member adjustable about the extension web's length to permit adjustment of the extension web's hook relative to the tape line hook. Modifications of the invention include an extension web positionable relative to the tape line. Accordingly, the organization permits ease of measurement from a position spaced from an engagement position of the extension web's hook member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tape measuring apparatus which has all the advantages of the prior art tape measure devices and none of the disadvantages.

It is another object of the present invention to provide a new and improved tape measuring apparatus which may be easily and efficiently manufactured and marketed.

It is a further object of the present invention to provide a new and improved tape measuring apparatus which is of a durable and reliable construction.

An even further object of the present invention is to provide a new and improved tape measuring apparatus which is susceptible of a low cost of manufacture with regard to both materials and labor, and which accordingly is then susceptible of low prices of sale to the consuming public, thereby making such tape measuring apparatus economically available to the buying public.

Still yet another object of the present invention is to provide a new and improved tape measuring apparatus which provides in the apparatuses and methods of the prior art some of the advantages thereof, while simultaneously overcoming some of the disadvantages normally associated therewith.

Still another object of the present invention is to provide a new and improved tape measuring apparatus wherein the same permits securement of a tape line of the organization at a spaced position relative to a point of origin of measuring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration, partially in section, illustrating a prior art tape measure apparatus.

FIG. 2 is an isometric illustration of a further prior art tape measure apparatus.

FIG. 3 is an orthographic side view, taken in elevation, of the instant invention.

FIG. 4 is an orthographic top view of the instant invention.

FIG. 4a is an isometric illustration of the tape extension hook utilized by the instant invention.

DESCRIPTION OF THE PREFERRED EMBODIMENT

Figure 5:
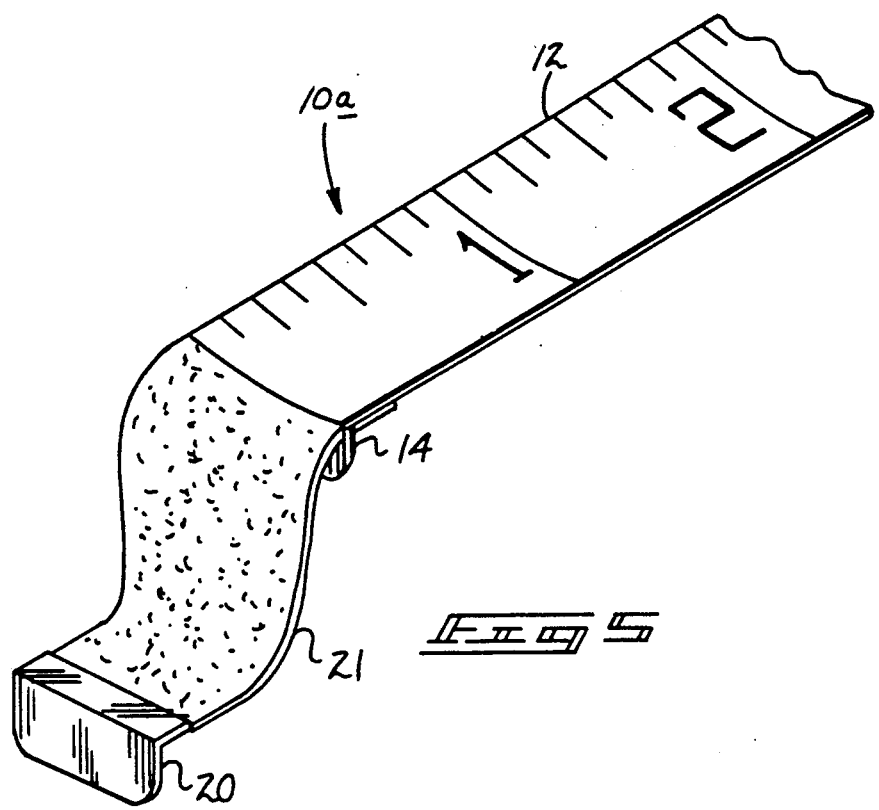
FIG. 5 is an isometric illustration of a modification of the instant invention.

With reference now to the drawings, and in particular to FIGS. 1 to 8 thereof, a new and improved tape measuring device embodying the principles and concepts of the present invention and generally designated by the reference numerals 10, 10a, and 10b will be described.

FIG. 1 illustrates a prior art tape measuring apparatus 1, including a housing 4 and a retractable flexible tape 3, with a forward hook thereon, with a resilient bumper 2 to cushion shock of the hook during its attraction to the housing. FIG. 2 illustrates a further prior art tape measuring apparatus 5 including a housing 6 mounting a clamp 7 to secure a writing instrument 8 thereon to permit scribing of a mark relative to the tape line 9.

More specifically, the tape measuring apparatus 10 of the instant invention essentially comprises a housing 11 defined by spaced parallel side walls, and a forward wall, including a lock plate 13 mounted thereon, with a flexible measuring tape line 12 defined by a predetermined width retractably mounted within the housing 11 and biased therewithin, wherein the lock plate 13 selectively clamps the tape line 12 in a relatively extended position relative to the housing and an associated opening through the forward wall of the housing. A belt hook 11a is mounted to a side wall of the housing to permit securement to an individual's belt for ease of transport of the housing 11. The flexible tape line 12 includes a tape line hook 14 integrally mounted to a forward terminal end thereof, wherein the tape line hook includes a vertical wall extending generally orthogonally relative to the tape line and downwardly therefrom to permit securement to a reference object. A flexible extension web 16 includes a rear terminal end and a forward terminal end, with the rear terminal end fixedly mounted to the tape line 12 and coextensive therewith, wherein an extension "L" shaped hook 15 is mounted in cooperation with the forward terminal end of the flexible web. The hook 15 includes a vertical leg 17 including a slot 18 formed therethrough. A series of spaced projections 19 mounted to a bottom surface of the horizontal leg portion of the "L" shaped hook 15 slidably receives the flexible extension web 16 therethrough to permit measuring from a reference position spaced from a hook position mounted by the hook 15, such as illustrated in FIG. 4 for example.

Figure 6:
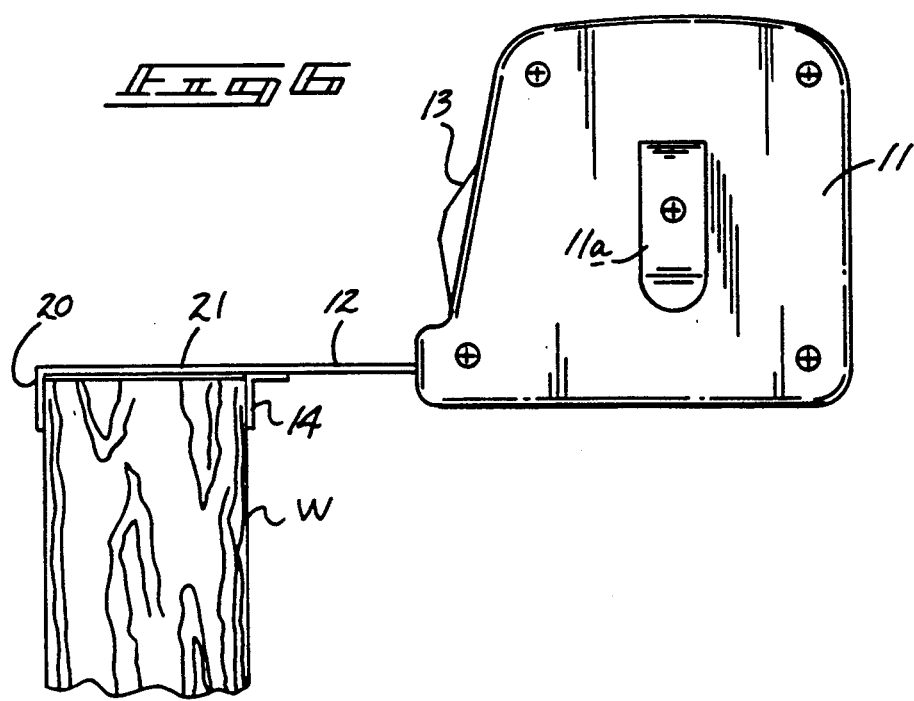
FIG. 6 is an orthographic side view utilizing the modification of the instant invention as illustrated in FIG. 5.

FIG. 5 illustrates the flexible tape line 12 in a modified tape measuring apparatus 10a, including extension web 21 fixedly mounted through a terminal end in coextension alignment with a forward terminal end of the tape line 12. The extension web 21 is formed of a stretchable polymeric sheet of the predetermined width equal to that of the tape line 12, and includes a rigid "L" shaped forward hook 20 mounted thereon to permit buoyant accommodation of the work piece "W", as illustrated in FIG. 6, whereupon the forward hook 20 may be mounted to a forward position on the work piece "W", whereupon measuring may originate at a rear reference point from the work piece "W", as illustrated in FIG. 6.

Figure 7:
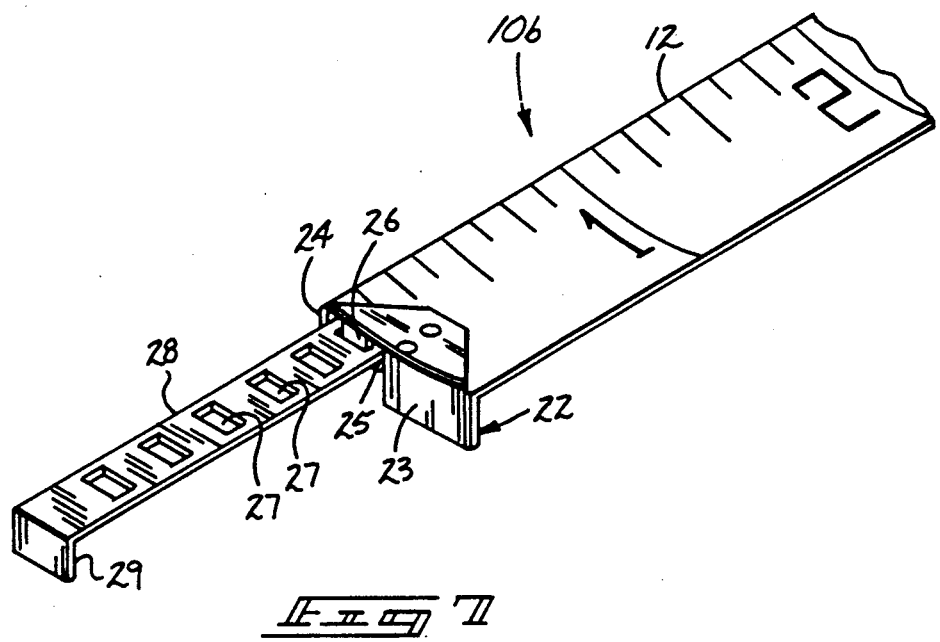
FIG. 7 is an isometric illustration of a further modification of the instant invention.
Figure 8:
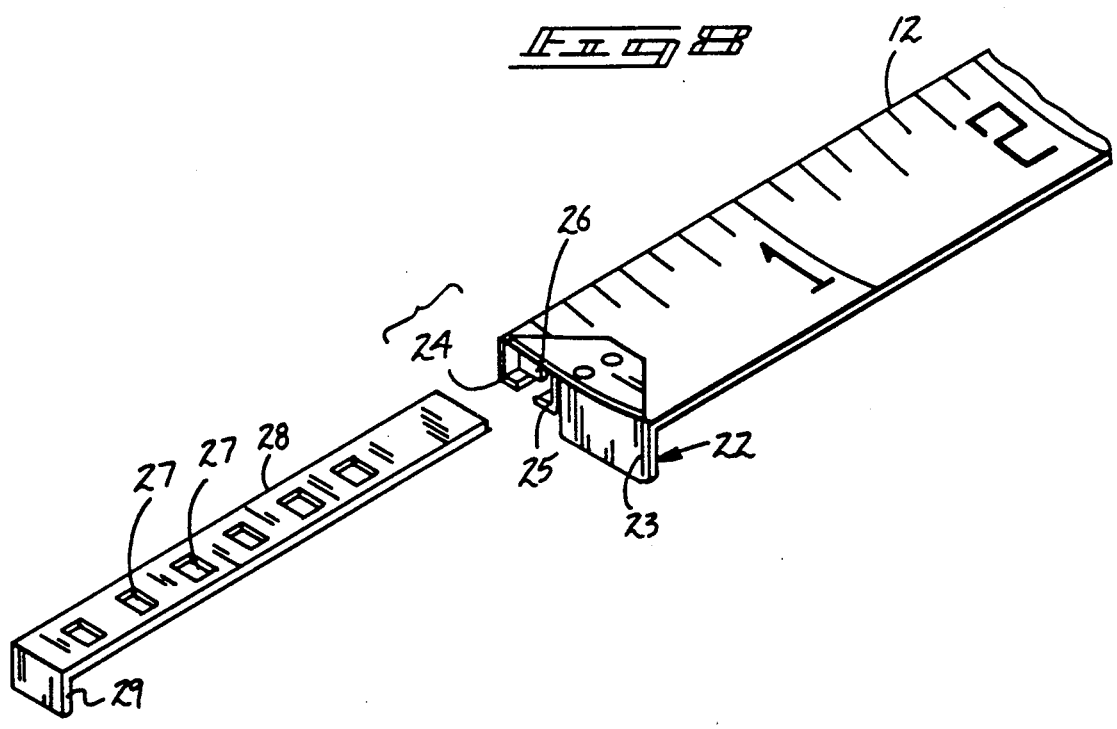
FIG. 8 is an isometric exploded illustration of the modification of the instant invention, as illustrated in FIG. 7.

FIG. 7 illustrates a further modified tape measuring apparatus 10b, wherein the tape line 12 includes a forward terminal end terminating in a rigid hook 22. The rigid hook 22 includes a vertical plate 23 of a width substantially half the predetermined width of the tape line 12. A respective first and second "L" shaped flange 24 and 25 are mounted to a bottom surface of the forward terminal end of the flexible tape line 12, wherein forward ends of the first and second flanges 24 and 25 are aligned with a rear surface of the vertical plate 23 to permit alignment of forward vertical hook wall 29 when 29 is in a retracted position within the first and second flanges, and accordingly provide a continuous surface defined by the vertical plate 23 and the forward vertical hook wall 29 when the hook wall 29 is in the retracted position, as noted. The first and second "L" shaped flanges 24 and 25 define a generally "T" shaped slot therebetween, wherein the flanges 24 and 25 are in a confronting relationship, with a lock projecting tab 26 integrally mounted to a bottom surface adjacent a forward terminal end of the flexible tape 12 to cooperate with equally spaced parallel slots 27 formed within a rigid extension tape line 28 receivable within the "T" shaped slot defined by the "L" shaped flanges. As a matter of reference, the slots 27 may be spaced apart a distance substantially equal to one-quarter inch to a maximum extent of one and one-half inches to accommodate typically encountered variations, wherein individuals may wish to secure the extension tape line 28 to an anchor position spaced from a point of reference where the individual wishes to begin measuring, such as illustrated in FIG. 6 for example.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tape measuring apparatus comprising, in combination,
   a housing including spaced parallel side walls, and a forward wall including an opening, and
   a flexible tape line of a predetermined width retractably mounted within the housing and extending through the opening, and
   the tape line including a forward terminal end, the forward terminal end including a tape line hook mounted integrally to the forward terminal end, with the tape line hook including a vertical leg mounted orthogonally to the forward terminal end of the tape line, and
   an extension web, the extension web including a rear terminal end, and
   the extension web including an extension web hook cooperatively mounted relative to a forward terminal end of the extension web, and
   wherein the extension web hook is integrally mounted to the forward terminal end of the extension web, and the extension web hook includes an extension web hook leg vertically mounted orthogonally to the forward terminal end of the extension web, and
   wherein the extension web is formed of a rigid material the rigid extension web and the extension web hook leg are each further defined by a width substantially equal to one-half the predetermined width, and the width of the vertical leg of the tape line hook is substantially equal to one-half the predetermined width, and the extension web is adjustably and slidably mounted relative to the tape line vertical leg and the forward terminal end of the tape line.

2. An apparatus as set forth in claim 1 further including a first and second "L" shaped flange, each first and second "L" shaped flange mounted to a bottom surface of the flexible tape line adjacent the forward terminal end, and wherein the forward ends of the first and second "L" shaped flanges are aligned with a rear surface of the vertical leg of the tape line hook, and the first and second "L" shaped flanges define a "T" shaped slot for receiving the rigid extension web therewithin.

3. An apparatus as set forth in claim 2 further including a projecting locking tab mounted orthogonally to the forward terminal end of the bottom surface of the flexible tape line, and the rigid extension web including a spaced series of slots cooperative with the projecting lock tab to permit engagement of the lock tab selectively within one of the slots to position the rigid extension web from a first retracted position, wherein the extension web vertical hook leg is in alignment with the vertical leg of the flexible tape line, to an extended position, wherein the extension web vertical hook leg is arranged in a spaced relationship forwardly of the vertical leg of the flexible tape line hook.

4. A tape measuring apparatus comprising, in combination,
   a housing including spaced parallel side walls, and a forward wall including an opening, and
   a flexible tape line of a predetermined width retractably mounted within the housing and extending through the opening, and
   the tape line including a forward terminal end, the forward terminal end including a tape line hook mounted integrally to the forward terminal end, with the tape line hook including a vertical leg mounted orthogonally to the forward terminal end of the tape line, and
   a flexible extension web, the web including a rear terminal end, the rear terminal end mounted in coextensive alignment with the forward terminal end of the flexible tape line, and
   the extension web including an extension web hook cooperatively mounted relative to a forward terminal end of the extension web, and
   wherein the extension web is formed of a resilient stretchable polymeric sheet and is defined by a width equal to the predetermined width defined by the flexible tape line, and wherein the extension web hook is a rigid hook.

* * * * *